United States Patent [19]

Lempereur

[11] Patent Number: 4,749,609
[45] Date of Patent: Jun. 7, 1988

[54] FLEXIBLE SEALING MEMBRANE, PARTICULARLY FOR ROOFS, WHICH COMPRISES A THERMOPLASTIC MATERIAL REINFORCED WITH A MESH OF SYNTHETIC FIBRES AND WITH A MESH OF GLASS FIBRES

[75] Inventor: Claude Lempereur, Renaix, Belgium

[73] Assignee: Plavina & Cie. (Société en Nom Collectif), Brussels, Belgium

[21] Appl. No.: 736,543

[22] Filed: May 21, 1985

[30] Foreign Application Priority Data

May 21, 1984 [FR] France ............................... 84 07997

[51] Int. Cl.$^4$ ................................................. B32B 7/00
[52] U.S. Cl. ..................................... 428/255; 428/105; 428/109; 428/273; 428/284
[58] Field of Search ............... 428/246, 247, 252, 251, 428/284, 285, 287, 273, 255, 105, 109

[56] References Cited

U.S. PATENT DOCUMENTS

| 4,368,228 | 1/1983 | Gorgati | 428/110 |
| 4,491,617 | 1/1985 | O'Connor et al. | 428/253 |
| 4,539,254 | 9/1985 | O'Conner et al. | 428/247 |

FOREIGN PATENT DOCUMENTS

| 0106328 | 4/1984 | European Pat. Off. |
| 1073974 | 6/1967 | United Kingdom . |
| 1403763 | 8/1975 | United Kingdom . |
| 1416449 | 12/1975 | United Kingdom . |

*Primary Examiner*—James J. Bell
*Attorney, Agent, or Firm*—Spencer & Frank

[57] ABSTRACT

The sealing membrane comprises a thermoplastic resin and a reinforcing system consisting of a mesh of glass fibres and a mesh of synthetic fibres, the reinforcing meshes being so selected that if the membrane is subjected to a progressive tensile load the tension applied at the moment of the rupture of the glass fibre mesh will as a maximum be equal to 90% of the tensile strength of the synthetic fibre mesh.

16 Claims, No Drawings

FLEXIBLE SEALING MEMBRANE, PARTICULARLY FOR ROOFS, WHICH COMPRISES A THERMOPLASTIC MATERIAL REINFORCED WITH A MESH OF SYNTHETIC FIBRES AND WITH A MESH OF GLASS FIBRES

The present invention relates to a flexible sealing membrane which is particularly suitable for covering and waterproofing flat roofs.

In Patent Applications Nos. NL-A-66.10796 and DE-A-31 50 021 sealing membranes have already been disclosed which are made from a thermoplastic material such as a chlorinated polyolefin or a terpolymer based on ethylene, propylene and diene. Membranes of this kind of generally reinforced with one or more reinforcement materials, such as meshes or woven or nonwoven webs of glass fibres or of natural or synthetic fibres which are incorporated in the mass of the membranes.

It has however been found that when membranes of this kind are reinforced with a materal based on synthetic or natural fibres, products are obtained which have satisfactory properties of elongation under tension, but whose shrinkage and dimensional stability are insufficient to permit their use in all designs of flat roofs, particularly those freely laid, or independently laid, as they re called.

On the other hand, when membranes of this kind are reinforced with a material based on glass fibres, products are obtained whose shrinkage and dimensional stability are improved but whose properties of elongation under tension leave much to be desired.

Consequently, it has not hitherto been possible to provide sealing membranes having an ideal range of properties making them particularly suitable for very wide use for covering and waterproofing roofs.

The Applicants have now produced a sealing membrane combining a range of properties which makes them suitable for all methods of laying roofs, for the application mentioned above.

The present invention thus relates to a flexible sealing membrane, particularly for roofs, which comprises a thermoplastic material and a reinforcement system consisting of a mesh of synthetic fibres and a mesh of glass fibres buried in the thermoplastic material, wherein the reinforcing meshes are so selected that if the membrane is subjected to a progressively increasing tensile load, the tension applied at the moment of the rupture of the glass fibre mesh will, as a maximum, be equal to 90% of the tensile strength of the synthetic fibre mesh.

It has in fact been fouond that the sealing membrane obtained in accordance with the invention not only possesses particularly satisfactory shrinkage, dimensional stability and properties of elongation under tension, but also has a range of mechanical properties, such as flexural fatigue strength, crack resistance, and so on, which are remarkable and particularly suitable for the use of the membrane for covering and waterproofing roofs, whatever the method of laying used.

In one embodiment the synthetic fibre mesh used for reinforcing the membrane is generally so selected as to have a tensile strength between 30 and 250 dN/5 cm and, in a preferred embodiment, between 50 and 180 daN/5 cm in each direction, and the glass fibre mesh is so selected as to have a tensile strength generally between 5 and 60 daN/5 cm and preferably between 20 and 50 daN/5 cm in each direction, the tensile strength being measured at 20° and with a tractive speed of 10 cm/min. It has in fact been observed that under these conditions membranes are obtained which have an ideal range of properties.

For the production of the membrane according to the invention use is generally made of a mesh of synthetic fibres having a weight between 20 and 300 grams per square metre and a mesh of glass fibres of a weight between 10 and 200 grams per square meter. A synthetic fibre mesh having a weight between 50 and 200 grams per square meter and a glass fibre mesh having a weight between 20 and 150 grams per square meter are preferably selected. As a rule, use is made of a synthetic fibre mesh comprising from 1 to 5 threads per centimeter in both directions, and of a glass fibre mesh comprising from 1 to 6 threads per centimeter, with the same or a different number of threads in each direction.

For the production of the synthetic fibre mesh it is possible to use any known synthetic fibres, particularly fibres based on acrylic resin, on polyamides, or on polyesters, the last-mentioned fibres being preferred. The synthetic fibres may be in the form of monofilaments or of multifilaments, or else in the form of optionally texturized strips.

For the production of the glass fibre mesh it is possible to use any known glass fibres, particularly glass (A), glass (E) or else glass (S) fibres. The glass fibres may be in the form of mono- or multifilaments.

The thermoplastic material of which the sealing membrane is composed may be any resin usually employed for making sealing membranes. As non-limitative examples, mention may be made of vinyl chloride based resins, chlorinated or chlorosulphonated polyolefins, particularly chlorinated or chlorosulphonated polyethylene, terpolymers based on ethylene, propylene and a diene, the neoprenes, polyisobutylenes, isoprenes, and so on, and also mixtures, in any proportions, of these resins with one another or with other constituents, such as bitumen, preference being given to mixtures of resins based on vinyl chloride and chlorinated polyolefin, more particularly to mixtures based on polyvinyl chloride and chlorinated polyethylene, having regard to their good incombustibility.

The thermoplastic material used for making te sealing membrane may in addition contain the usual additives, such as stabilizers, flame retardants, plasticizers, pigments, dyes, fillers and reinforcing materials, and the like.

In a preferred embodiment the sealing membrane is composed in succession of a layer of thermoplastic resin, a glass fibre mesh, a synthetic fibre mesh, and a layer of thermoplastic resin, these layers being joined toether by hot rolling, for example with the aid of a calendering or coating apparatus.

In another possible embodiment the sealing membrane according to the invention may contain a single mixed reinforcing mesh comprising both synthetic fibres and glass fibres. In this case it is of course appropriate that the tensile strength imparted to the membrane by all the fibres should be such as to comply with the relationship indicated above. It is also appropriate for the glass fibres and the synthetic fibres to be distributed uniformly in the reinforcing mesh.

The sealing membrane according to the invention generally has a thickness between 0.5 and 3 mm and an elongation, at the rupture of the strongest element, between 12 and 20%, together with shrinkage lower than 0.3%.

The sealing membrane according to the invenis furthermore explained in greater detail in the practical examples given below, Examples 1 and 3 being reference examples which do not form part of the scope of the invention.

EXAMPLE 1 (REFERENCE)

Hot rolling is employed to produce a membrane consisting of two outer sheets of a thickness of 0.6 mm, made by calendering from a mixture composed of 75% by weight of chlorinated polyethylene and 25% by weight of polyvinyl chloride, and of an internal reinforcing mesh of polester fibres, comprising per centimeter 2×2 threads of 1100 decitex each and having a tensile strength of 80 daN/5 cm in both directions.

The sealing membrane constructed in this manner has an elongation of 17.6% at the moment of the rupture of the reinforcing mesh. However, it appears that this membrane has in addition a shrinkage of the order of 0.5% after 6 hours at 80° C. and that the dimensional stability of the membrane is consequently not sufficient to cover all the laying techniques used for roofs.

EXAMPLE 2

A sealing membrane is produced as in Example 1, but incorporating as internal reinforcement, in addition to the mesh of polyester fibres, a mesh of glass fibres comprising, per centimeter, 2×2 threads of 340 decitrex each and having a tensile strength of 18 daN/5 cm.

A sample of the membrane produced in this way was subjected to a progressively increasing tensile load at 20°, with a tractive speed of 10 cm/min. The traction diagram shows a first peak at a tensile load of 42 daN/5 cm applied to the whole of the membrane and corresponding to the rupture of the glass fibre mesh, and then a second peak at a tensile load of 80 daN/5 cm corresponding to the rupture of the polyester fibre mesh.

In the membrane according to the example it therefore appears that the tension applied to the whole of its constituents at the moment of the rupture of the glass fibre mesh, i.e. 42 daN/5 cm, is lower than 90% of the tensile strength of the synthetic fibre mesh (90% of 80 daN/5 cm).

The membrane according to Example 2 has an elongation of 17.8% at the rupture of the polyester fibre mesh, and a shrinkage after 6 hours at 80° lower than 0.3%. The membrane consequently has a range of properties, and in particular a compromise between elongation at rupture and dimensional stability, which make it Particularly suitable for use for sealing and waterproofing roofs, whatever the method of laying.

EXAMPLE 3 (REFERENCE)

The procedure is the same as in Example 2 except that the glass fibre mesh is replaced by a mesh which is likewise of glass fibres but comprises, per centimeter, 5×5 threads of 340 decitex each and has a tensile strength of 44 daN/5 cm.

A sample of the membrane produced in this manner is subjected to an increasing tensile load as in Example 2. It is found that the traction diagram plotted shows a first peak at a tensile load of 74 daN/5 cm applied to the entire membrane and corresponding to the rupture of the glass fibre mesh, and then a second peak at a tensile load of 80 daN/5 cm corresponding to the rupture of the polyester fibre mesh.

In the membrane according to Example 3, it therefore appears that the tension applied to the whole of the constituents at the moment of the rupture of the glass fibre mesh, i.e. 74 daN/5cm, is higher than 90% of the tensile strength of the polyester fibre mesh (90% of 80 daN/5 cm).

The membrane according to Example 3 has a shrinkage after 6 hours at 80° C. lower than 0.2%, but its elongation at the rupture of the polyester fibre mesh amounts to only 6.9%.

The membrane therefore has an elongation at break which does not permit free laying when it is used for waterproofing roofs.

I claim:

1. A flexible sealing membrane, particularly for roofs, comprising a thermoplastic material and a reinforcing system consisting of a mesh of synthetic fibres and a mesh of glass fibres buried in the thermoplastic material, the meshes so selected that when the membrane is subjected to a progressive tensile load the tension applied at the moment of the rupture of the glass fibre mesh is as a maximum equal to 90% of the tensile strength of the mesh of synthetic fibres.

2. The Sealing membrane according to claim 1, wherein the glass fibre mesh has a tensile strength between 5 and 60 daN/5cm.

3. Sealing membrane according to claim 1, characterized in that the synthetic fibre mesh has a tensile strength between 30 and 250 daN/5 cm.

4. The Sealing membrane according to claim 1, wherein the weight of the synthetic fibre mesh is between 20 and 300 grams per square meter.

5. The Sealing membrane according to claim 1, wherein the weight of the glass fibre mesh is between 10 and 200 grams per square meter.

6. The Sealing membrane according to claim 1, wherein the synthetic fibre mesh is made from polyester fibres.

7. The Sealing membrane according to claim 1, wherein the thermoplastic material is composed of a mixture of chlorinated polyolefin and vinyl chloride based resins.

8. The Sealing membrane according to claim 1, wherein it has a elongation, at the moment of rupture of the strongest element, between 12 and 20% and a shrinkage lower than 0.3%.

9. The Sealing membrane according to claim 1, wherein it is formed in succession of a layer of thermoplastic material, a mesh of synthetic fibres, a mesh of glass fibres, and a second layer of thermoplastic material, these layers being joined together by hot rolling.

10. A flexible sealing membrane, particularly for roofs, comprising a thermoplastic material composed of a mixture of chlorinated polyolefin and vinyl chloride based resins and a reinforcing system consisting of a mesh of polyester fibers and a mesh of glass fibers buried in the mixture of chlorinated polyolefin and vinyl chloride based resins, the meshes so selected that when the membrane is subjected to a progressive tensile load the tension applied at the moment of the rupture of the glass fiber mesh is at most equal to 90% of the tensile strength of the mesh of polyester fibers.

11. The sealing membrane according to claim 10, wherein the glass fiber mesh has a tensile strength between 5 and 60 daN/5 cm.

12. The sealing membrane according to claim 10, wherein the polyester fiber mesh has a tensile strength between 30 and 250 daN/5 cm.

13. The sealing membrane according to claim 10, wherein the weight of the polyester fiber mesh is between 20 and 300 grams per square meter.

14. The membrane according to claim 10, wherein the weight of the glass fiber mesh is between 10 and 200 grams per square meter.

15. The membrane according to claim 10, wherein said membrane has an elongation between 12 and 20% at the moment of rupture of the strongest element, and a shrinkage less than 0.3%.

16. The sealing membrane according to claim 10, formed in succession of a layer of a mixture of chlorinated olefin and vinyl chloride based resins, a mesh of polyester fibers, a mesh of glass fibers, and a second layer of a mixture of chlorinated polyolefin and vinyl chloride based resins, these layers being joined together by hot rolling.

* * * * *